United States Patent [19]
Endo et al.

[11] Patent Number: 6,120,414
[45] Date of Patent: Sep. 19, 2000

[54] NEGATIVE PRESSURE CONTROL APPARATUS FOR BRAKE BOOSTER

[75] Inventors: Hiroaki Endo; Yoshihisa Yamada, both of Suntoh-gun; Ryochi Watanabe, Susuno, all of Japan

[73] Assignee: Toyota Jidosha Kabushiki Kaisha, Toyota, Japan

[21] Appl. No.: 09/291,937

[22] Filed: Apr. 15, 1999

[30] Foreign Application Priority Data

Jun. 1, 1998 [JP] Japan .................................. 10-151584

[51] Int. Cl.⁷ .............................. B60T 13/52; B60T 7/12
[52] U.S. Cl. ............................................................ 477/185
[58] Field of Search ..................................... 477/185, 183

[56] References Cited

U.S. PATENT DOCUMENTS 3,581,852  6/1971  Griffen et al. ........................... 477/185

FOREIGN PATENT DOCUMENTS

| | | |
|---|---|---|
| 5-208663 | 8/1993 | Japan . |
| 5-208665 | 8/1993 | Japan . |
| 7-247866 | 9/1995 | Japan . |
| 8-164840 | 6/1996 | Japan . |
| 8-318764 | 12/1996 | Japan . |

*Primary Examiner*—Dirk Wright
*Attorney, Agent, or Firm*—Oliff & Berridge, PLC

[57] ABSTRACT

A negative pressure control apparatus for a brake booster is provided which can maintain a required negative pressure in the brake booster without unnecessarily increasing the negative pressure of the brake booster. The apparatus has a negative pressure controller for controlling the negative pressure in a negative pressure chamber of the brake booster toward a predetermined target value. A pedal operation determining part determines whether or not both an accelerator pedal and a brake pedal are depressed. When both the accelerator pedal and the brake pedal are depressed, a target negative pressure setting part sets the predetermined target value to be larger than a value used in a regular situation.

7 Claims, 4 Drawing Sheets

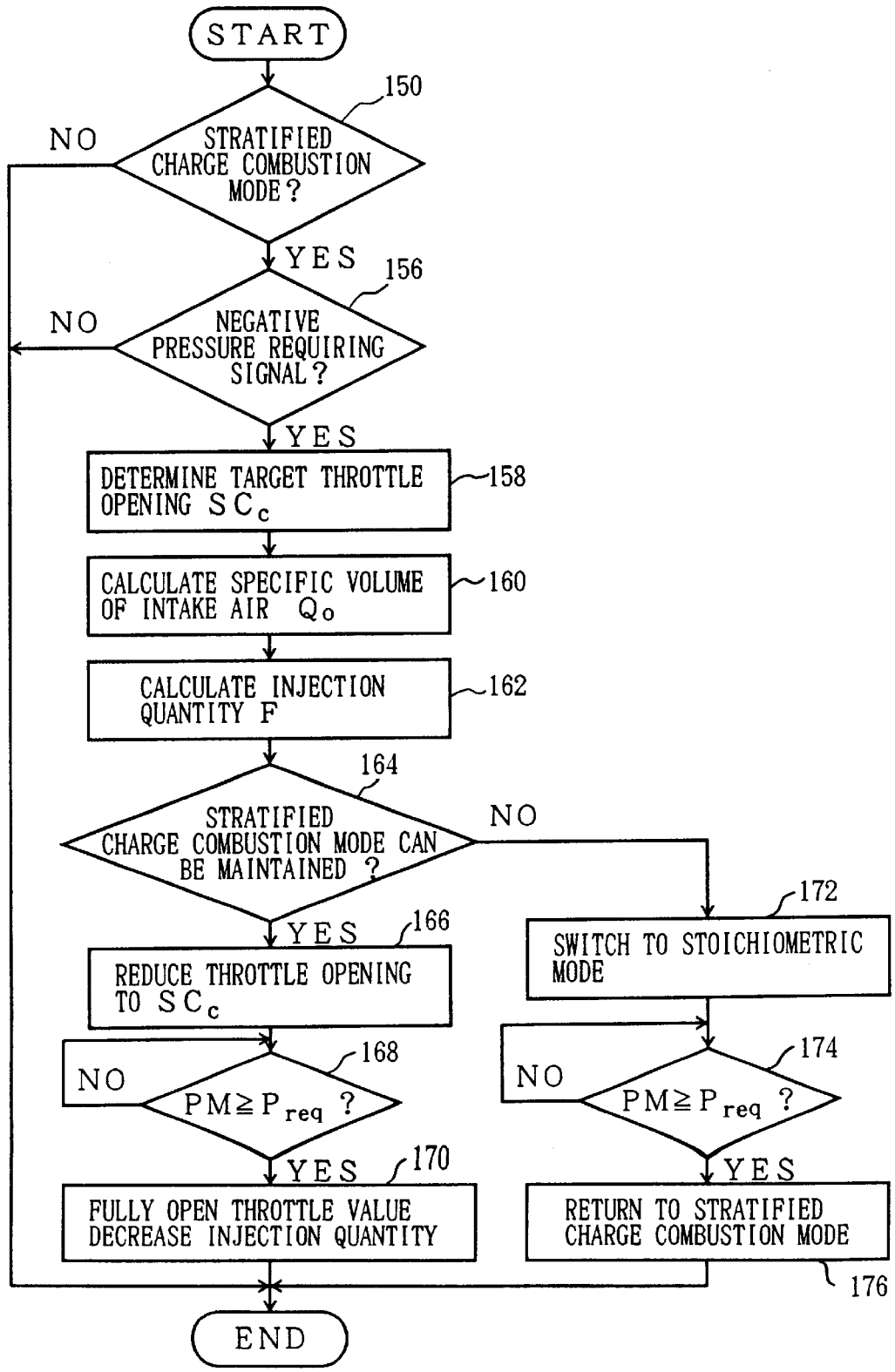

NEGATIVE PRESSURE CONTROL APPARATUS FOR BRAKE BOOSTER

BACKGROUND OF THE INVENTION

1. Field of the Invention

The present invention relates to a negative pressure control apparatus for a brake booster, and particularly to a negative pressure control apparatus for controlling negative pressure of a brake booster which is actuated by using intake manifold negative pressure as a power source.

2. Description of the Related Art

Conventionally, as disclosed in Japanese Laid-Open Patent Application No. 8-164840, a negative pressure control apparatus for controlling negative pressure of a brake booster is known. The brake booster is a mechanism which assists a brake operation by using an intake manifold negative pressure as a power source so that a larger braking force can be generated.

The above-mentioned negative pressure control apparatus is applied to an engine which has a fuel injector disposed inside a combustion chamber and directly injects fuel into the combustion chamber (hereinafter such an engine is referred to as a direct injection engine). According to the direct injection engine, fuel economy can be improved by fully opening a throttle valve so that a large volume of air is supplied to the combustion chamber to achieve stratified charge combustion when, for example, the engine is operating under a low load. However, in the direct injection engine, sufficient negative pressure may not be supplied to the brake booster since the intake manifold negative pressure is decreased by the throttle valve being fully opened even when an accelerator pedal is not being operated. For this reason, the above-mentioned negative pressure control apparatus generates a larger intake manifold negative pressure by forcibly closing the throttle valve when the negative pressure of the brake booster becomes smaller than a predetermined value.

When the throttle valve is forcibly closed, the operating state of the engine is changed, which may affect driving performance of a vehicle. Therefore, the process for generating a larger intake manifold negative pressure should be performed only as necessary. Additionally, negative pressure which is required in the brake booster changes in accordance with situations. For example, when both a brake pedal and an accelerator pedal are depressed, a larger negative pressure is required so as to generate a larger braking force by a value matching the driving force generated by the depression of the accelerator pedal.

However, the above-mentioned conventional negative pressure control apparatus simply closes the throttle valve when the negative pressure of the brake booster becomes smaller than the predetermined value. Thus, in the conventional apparatus, the throttle valve may be unnecessarily closed and thus generate unnecessary negative pressure, or sufficient negative pressure may not be maintained in the brake booster resulting in an insufficient assist force, depending on a setting of the predetermined value.

SUMMARY OF THE INVENTION

It is an object of the present invention to provide a negative pressure control apparatus for a brake booster, which apparatus is capable of maintaining a required negative pressure of the brake booster without unnecessarily increasing the negative pressure of the brake booster.

The above object of the present invention can be achieved by a negative pressure control apparatus for a brake booster for controlling negative pressure in a negative pressure chamber of the brake booster, which brake booster assisting a brake operation using the negative pressure, the apparatus comprising:

a negative pressure controller for controlling the negative pressure in said negative pressure chamber toward a predetermined target value;

a pedal operation determining part for determining whether or not both an accelerator pedal and a brake pedal are depressed; and a target negative pressure setting part for setting the predetermined target value to be larger than a value used in a regular situation when said pedal operation determining part determines that both the accelerator pedal and the brake pedal are depressed.

In this invention, the negative pressure controller controls the negative pressure in the negative pressure chamber of the brake booster (hereinafter referred to as a booster negative pressure) toward a predetermined target value. When both an accelerator pedal and a brake pedal are depressed, a driving force and a braking force are simultaneously generated. In this case, a larger booster negative pressure is required in the negative pressure chamber to generate a larger braking force by a value matching the driving force generated by the depression of the accelerator pedal. The target negative pressure setting part sets the predetermined target value to be greater than a value used in a regular situation when both the accelerator pedal and the brake pedal are depressed. Thus, when a larger booster negative pressure is required, the booster negative pressure is controlled toward the greater target value. Thus, according to the invention, the required booster negative pressure can be achieved without unnecessarily increasing the negative pressure of the brake booster.

In this case, the negative pressure chamber can be connected to an intake pipe of an engine at a position downstream of a throttle valve, and the negative pressure controller controls the negative pressure in the negative pressure chamber by changing an opening of said throttle valve.

In this invention, negative pressure in the intake passage downstream of the throttle valve changes in accordance with the opening of the throttle valve. The negative pressure in the negative pressure chamber is increased until it is equalized with the negative pressure in the intake passage. Consequently, the negative pressure controller can control the booster negative pressure by changing the throttle opening. Thus, according to the invention, the required booster negative pressure can be achieved without unnecessarily closing the throttle valve.

Other objects and further features of the present invention will be apparent from the following detailed description when read in conjunction with the accompanying drawings.

BRIEF DESCRIPTION OF THE DRAWINGS

FIG. 4 is a flowchart of an example of a routine performed by an engine ECU in the present embodiment.

DESCRIPTION OF THE PREFERRED EMBODIMENTS

Figure 1:
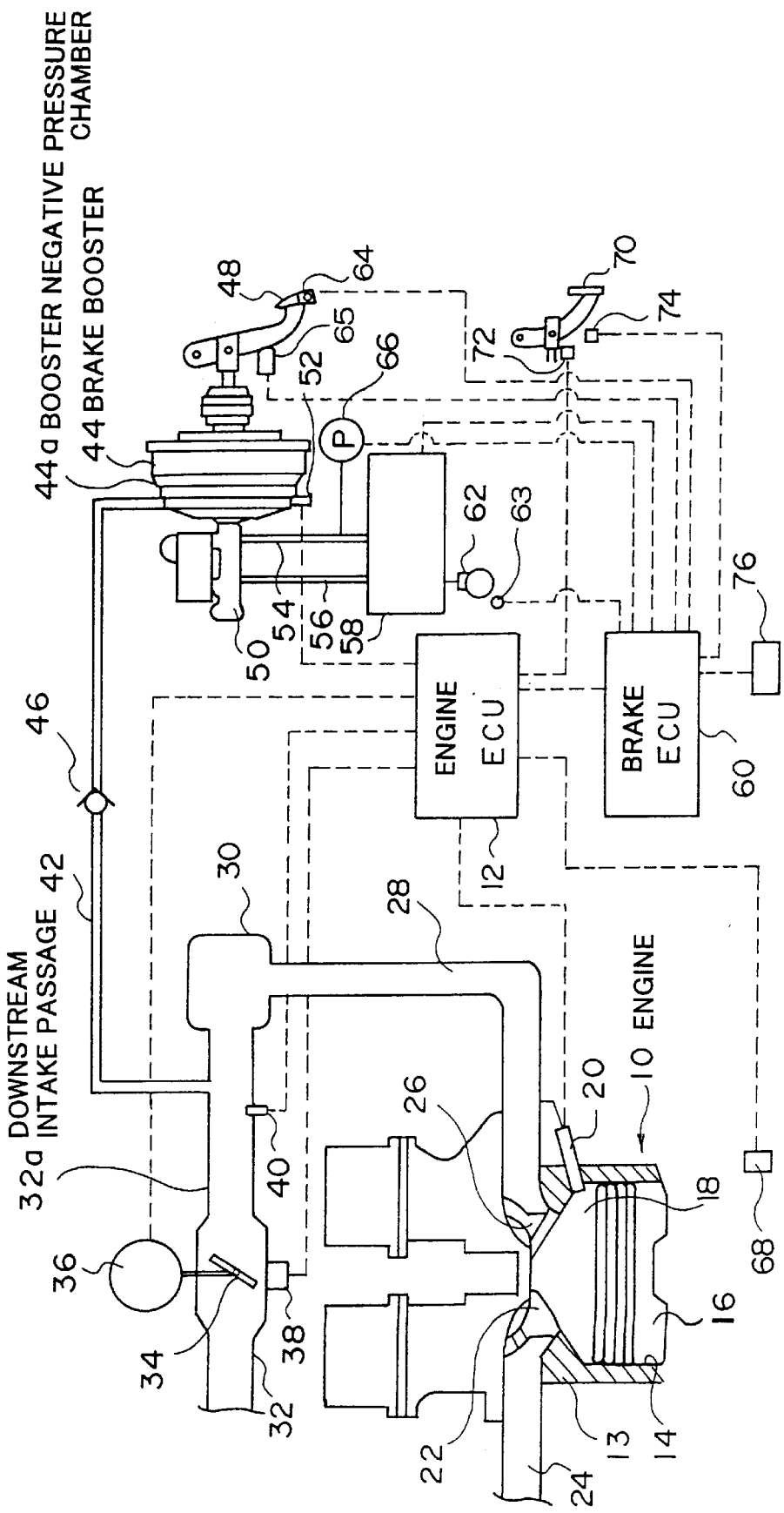
FIG. 1 is a system structure diagram of an embodiment of the present invention.

FIG. 1 shows a system structure diagram of an embodiment according to the present invention. The system of the present embodiment includes an engine 10. The engine 10 is controlled by an engine ECU 12. The engine 10 has a cylinder block 13. A cylinder 14 is formed inside the cylinder block 13. The engine 10 has a plurality of cylinders and only one cylinder 14 is shown in FIG. 1.

A piston 16 is disposed in the cylinder 14. The piston 16 can move vertically in the cylinder 14. A combustion chamber 18 is defined inside the cylinder 14 above the piston 16. An injection port of a fuel injector 20 is exposed in the combustion chamber 18. The fuel injector 20 injects fuel in the combustion chamber in response to a control signal supplied by the engine ECU 12. That is, the engine 10 of the present embodiment is a direct injection engine.

An exhaust pipe 24 is connected to the combustion chamber 18 via an exhaust valve 22. Additionally, an intake manifold 28 is connected to the combustion chamber 18 via an intake valve 26. A surge tank 30 is connected to an upstream side of the intake manifold 28. Further, an intake pipe 32 is connected to an upstream side of the surge tank 30.

A throttle valve 34 is disposed in the intake pipe 32. The throttle valve 34 is connected to a throttle motor 36. The throttle motor 36 is electrically connected to the engine ECU 12. The throttle motor 36 changes an opening of the throttle valve 34 (hereinafter referred to as a throttle opening SC) in response to a control signal supplied by the engine ECU 12. A throttle-opening sensor 38 is disposed near the throttle valve 34. The throttle-opening sensor 38 delivers an electric signal in accordance with the throttle opening SC to the engine ECU 12. The engine ECU 12 detects the throttle opening SC based on the signal delivered by the throttle-opening sensor 38.

An intake pressure sensor 40 is disposed in the intake pipe 32 at a position downstream of the throttle valve 34. Hereinafter, this part of the intake pipe 32 is referred to as a downstream intake passage 32a. The intake pressure sensor 40 delivers an electric signal to the engine ECU 12 in accordance with a negative pressure in the downstream intake passage 32a (hereinafter referred to as an intake manifold negative pressure PM). The engine ECU 12 detects the intake manifold negative pressure PM based on the signal delivered by the intake pressure sensor 40.

One end of a negative pressure supply passage 42 is connected to the downstream intake passage 32a. The other end of the negative pressure supply passage 42 is connected to a negative pressure chamber of a brake booster 44. Hereinafter, the negative pressure chamber of the brake booster 44 is referred to as a booster negative pressure chamber 44a.

A check valve 46 is disposed in the negative pressure supply passage 42. The check valve 46 is a one-way valve which permits a flow of air only in a direction from the booster negative pressure chamber 44a to the downstream intake passage 32a. Thus, when the intake manifold negative pressure PM is larger than a negative pressure in the booster negative pressure chamber 44a (hereinafter referred to as a booster negative pressure PB), the booster negative pressure PB is increased until it is equalized with the intake manifold pressure PM. On the other hand, when the intake manifold negative pressure PM is smaller than the booster negative pressure PB, air is prevented from flowing from the downstream intake passage 32a to the booster negative pressure chamber 44a, and thus the booster negative pressure PB is prevented from being decreased.

It should be noted that, in the present specification, a "negative pressure" is represented by a pressure difference relative to the atmospheric pressure. Thus, an expression that "a negative pressure is large" means that the pressure difference relative to the atmospheric pressure is large, that is, an absolute pressure is low.

The brake booster 44 is connected to a brake pedal 48 and a master cylinder 50. The brake booster 44 assists an operation of the brake pedal 48 by using the booster negative pressure PB as a power source so that a higher fluid pressure is generated in fluid chambers of the master cylinder 50. Hereinafter, the fluid pressure generated in the fluid chambers of the master cylinder 50 is referred to as a master cylinder pressure $P_{M/C}$. A booster pressure sensor 52 is disposed in the booster negative pressure chamber 44a. The booster pressure sensor 52 delivers an electric signal to the engine ECU 12 in accordance with the booster negative pressure PB. The engine ECU 12 detects the booster negative pressure PB based on the signal delivered by the booster pressure sensor 52.

A hydraulic actuator 58 is connected to the fluid chambers of the master cylinder 50 via fluid pressure passages 54, 56, respectively. The fluid pressure passage 54 corresponds to a brake system for rear wheels, and the fluid pressure passage 56 corresponds to a brake system for front wheels.

The hydraulic actuator 58 is controlled by a brake ECU 60. Wheel cylinders 62 provided to the respective wheels are connected to the hydraulic actuator 58. Wheel speed sensors 63 are disposed near the respective wheels. In FIG. 1, only the wheel cylinder 62 and the wheel speed sensor 63 for one of the wheels are shown. Each of the wheel speed sensors 63 delivers a pulse signal to the brake ECU 60 in accordance with a wheel speed VW. The brake ECU 60 detects the wheel speed VW based on the signals delivered by the wheel speed sensors 63. The brake ECU 60 calculates a wheel acceleration DVW based on a change rate of the wheel speed VW. Further, the brake ECU 60 calculates a vehicle speed V based on the wheel speed VW.

A master pressure sensor 66 is disposed in the fluid pressure passage 54 corresponding to the brake system for the rear wheels. The master pressure sensor 66 delivers an electric signal to the brake ECU 60 in accordance with a fluid pressure in the fluid pressure passage 54, that is, the master cylinder pressure $P_{M/C}$. The brake ECU 60 detects the master cylinder pressure $P_{M/C}$ based on the signal delivered by the master pressure sensor 66.

A pedal effort switch 64 is mounted on the brake pedal 48. The pedal effort switch 64 delivers an ON signal to the brake ECU 60 only when a pedal effort applied to the brake pedal 48 exceeds a predetermined value. Additionally, a brake switch 65 is disposed near the brake pedal 48. The brake switch 65 delivers an ON signal to the brake ECU 60 only when the brake pedal 48 is depressed.

The system of the present embodiment achieves a regular brake control which generates a braking force in accordance with a brake operation by controlling the hydraulic actuator 58 to supply the master cylinder pressure $P_{M/C}$ to the wheel cylinders 62. Additionally, the system of the present embodiment can achieve various brake controls such as an antilock brake control (ABS) for preventing a lock of wheels and a traction control (TRC) for preventing a slip of wheels due to an excessive driving torque by controlling the hydraulic actuator 58 based on information such as a slip state of the wheels, a vehicle acceleration and a yaw rate.

Further, the system of the present embodiment can achieve a brake assist (BA) control which generates a larger braking force as compared to a case of a regular brake control when an emergency brake operation is performed.

The BA control can be achieved by detecting an emergency brake operation based on, for example, an increasing rate of the master cylinder pressure $P_{M/C}$ and by increasing the wheel cylinder pressure using a high pressure source (a pump, for example) when the emergency brake operation is detected.

As shown in FIG. 1, a revolution sensor 68 is provided to the engine 10. The revolution sensor 68 delivers a pulse signal to the engine ECU 12 in accordance with a rotational speed Ne of the engine 10. The engine ECU 12 detects the rotational speed Ne based on the signal delivered by the revolution sensor 68.

An accelerator-opening sensor 72 is provided near an accelerator pedal 70. The accelerator-opening sensor 72 delivers an electric signal to the engine ECU 12 in accordance with a stroke of the accelerator pedal 70 (hereinafter referred to as an accelerator opening AC). The engine ECU 12 detects the accelerator opening AC based on the signal delivered by the accelerator-opening sensor 72.

An accelerator pedal contact 74 is provided near the accelerator pedal 70. The accelerator pedal contact 74 is electrically connected to the brake ECU 60. The accelerator pedal contact 74 is set in a closed state when the accelerator pedal 70 is not depressed and set in an open state when the accelerator pedal 70 is depressed. The brake ECU 60 determines whether or not the accelerator pedal 70 is depressed based on the state of the accelerator pedal contact 74.

A deceleration sensor 76 is connected to the brake ECU 60. The deceleration sensor 76 delivers an electric signal to the brake ECU 60 in accordance with a vehicle deceleration Gx. The brake ECU 60 detects the vehicle deceleration Gx based on the signal delivered by the deceleration sensor 76.

In the present embodiment, the engine 10 operates in one of a stoichiometric combustion mode and a stratified charge combustion mode in accordance with a load thereof. In the stoichiometric combustion mode, a stoichiometric combustion is achieved in the combustion chamber 18 by changing the throttle opening SC based on the accelerator opening AC so that the volume of air supplied to the combustion chamber 18 is controlled in accordance with the acceleration opening AC. In the stratified charge combustion mode, a stratified charged combustion is achieved in the combustion chamber 18 by fully opening the throttle valve 34 so that a large volume of air is supplied to the combustion chamber 18 and by injecting a quantity of fuel corresponding to the accelerator opening AC during compression strokes of the engine 10.

According to the stratified charged combustion mode, a fuel economy is improved because a larger air-fuel ratio is achieved in the combustion chamber 18 as compared to a case of the stoichiometric combustion mode. Additionally, the fuel economy is further improved in the stratified charge combustion mode because a pumping loss of the engine 10 is reduced by the throttle valve 34 being fully opened. Therefore, from a viewpoint of improving the fuel economy, it is desirable to operate the engine 10 in the stratified charge combustion mode.

However, when a load of the engine 10 (that is, the acceleration opening AC) is increased, a quantity of fuel injected by the fuel injector 20 becomes large. In this case, the stratified charge combustion can no longer be achieved when the injection quantity exceeds a certain value, because a volume of air supplied to the intake pipe 32 (that is, a specific volume of intake air Q) becomes too small as compared to the injection quantity even if the throttle valve 34 is fully opened.

For the above reasons, the engine ECU 12 calculates the injection quantity based on the accelerator opening AC and determines whether or not the stratified charge combustion can be achieved with the calculated injection quantity. When it is determined that the stratified charge combustion can be achieved, the engine ECU 12 achieves the stratified charge combustion mode by fully opening the throttle valve 34 and controlling the injector 20 to inject a quantity of fuel corresponding to the accelerator opening AC during compression strokes of the engine 10. On the other hand, if it is determined that the stratified charge combustion cannot be achieved, the engine ECU 12 achieves the stoichiometric combustion mode by setting the throttle opening SC to be a value corresponding to the accelerator opening AC and controlling the injector 20 to inject a quantity of fuel corresponding to the throttle opening SC during intake strokes of the engine 10.

As mentioned above, in the stratified charge combustion mode, the throttle valve 34 is fully opened regardless of the accelerator opening AC. When the throttle valve 34 is fully opened, the negative pressure generated in the downstream intake passage 32a (that is, the intake manifold negative pressure PM) becomes small. Additionally, the brake booster 44 assists a brake operation by using the booster negative pressure PB as a power source, and thus the booster negative pressure PB is decreased more as the braking force becomes larger. Therefore, in the stratified charge combustion mode, since the intake manifold negative pressure PM is smaller than the booster negative pressure PB, the booster negative pressure PB is gradually decreased in association with the brake operation. For this reason, if a brake operation is performed when the engine 10 is operating in the stratified charge combustion mode, it is possible that the brake booster 44 cannot sufficiently assist the brake operation due to the insufficient booster negative pressure PB.

Such a problem may be avoided by reducing the throttle opening SC so that a larger intake manifold negative pressure PM is generated. When a larger intake manifold negative pressure PM is generated, the booster negative pressure PB is increased so as to equalize with this large intake manifold negative pressure PM, and thus a sufficiently large booster negative pressure PB can be obtained. Hereinafter, a control for obtaining a large booster negative pressure PB by reducing the throttle opening SC is referred to as a booster negative pressure control.

However, when the throttle opening SC is reduced in the stratified charge combustion mode, the fuel economy is deteriorated due to an increase in the pumping loss. Additionally, when the throttle opening SC is further reduced to such an extent that the stratified charge combustion mode can no longer be maintained, the operation mode of the engine 10 has to be switched to the stoichiometric combustion mode. On the other hand, a value of the required booster negative pressure PB changes in accordance with situations such as a state of brake operation. For example, when an emergency brake operation is performed, a larger booster negative pressure PB is required as compared to a case of a regular brake operation. Thus, it is desirable to minimize usage of the booster negative pressure control to a minimum extent by adjusting the required booster negative pressure PB to be generated in accordance with situations.

From the above point of view, in the system of the present embodiment, a situation in which a larger booster negative pressure PB is required as compared to a regular situation is detected, and when such a situation is detected, a target negative pressure of the booster negative pressure control is set to be a greater value so that the required negative booster pressure PB can be obtained without unnecessarily generating negative pressure, that is, without unnecessarily reducing the throttle opening SC.

In the present embodiment, the engine ECU 12 transmits a signal including a value of the booster negative pressure PB to the brake ECU 60 at appropriate timings. The brake ECU 60 detects the booster negative pressure PB based on the signal. When the negative booster pressure PB is smaller than a predetermined reference value P0, the brake ECU 60 determines that negative pressure in the booster negative pressure chamber 44a should be increased and transmits a signal requiring an increase of negative pressure (hereinafter referred to as a negative pressure requiring signal) including a value of negative pressure required by the booster negative pressure chamber 44a (hereinafter referred to as a required negative pressure value $P_{req}$) to the engine ECU 12. When the engine ECU 12 receives the negative pressure requiring signal, it performs the booster negative pressure control so that an intake manifold negative pressure PM equal to the required negative pressure value $P_{req}$ is generated.

The brake ECU 60 determines that a larger booster negative pressure PB is required as compared to a regular situation when a failure of a brake system (hereinafter referred to as a brake failure) has occurred such as a leakage of brake fluid in the hydraulic actuator 58, when both the brake pedal 48 and the accelerator pedal 70 are depressed, or when an emergency brake operation is being performed. When it is determined that a larger booster negative pressure PB is required, each of the reference value P0 and the required negative pressure value $P_{req}$ is set to be greater than a value used in a regular situation. Thus, according to the present embodiment, in a situation in which a larger booster negative pressure PB is required as compared to a regular situation, the booster negative pressure control is performed with a target value larger than a value used in the regular situation when the booster negative pressure PB becomes smaller than a reference value P0 greater than a value used in the regular situation.

Figure 2:
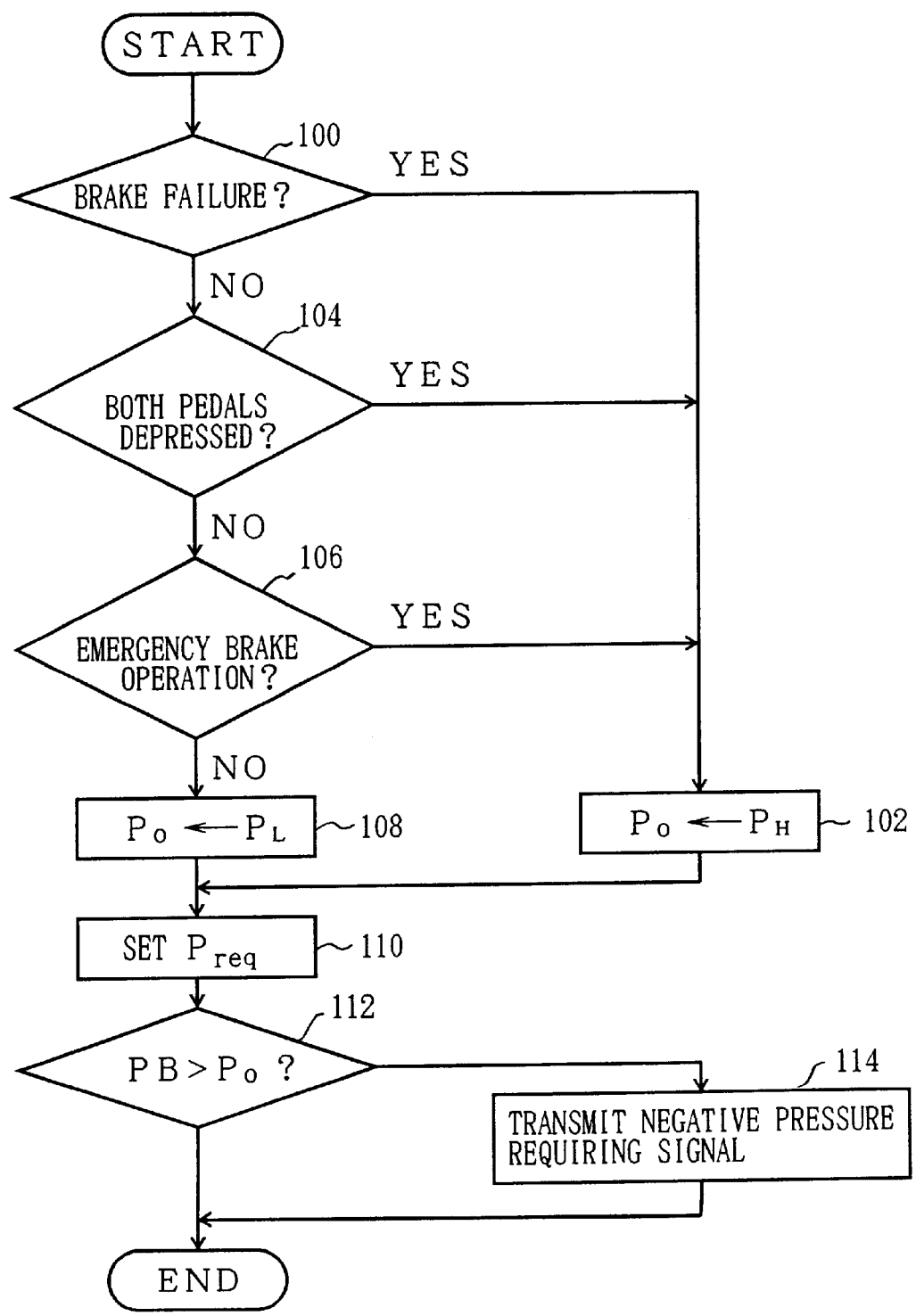
FIG. 2 is a flowchart of an example of a routine performed by a brake ECU in the present embodiment.

Now, a description will be given of detailed processes performed by the brake ECU 60 and the engine ECU 12 in the present embodiment so as to achieve the above-mentioned function. First, a description will be given of a process performed by the brake ECU 60 with reference to FIG. 2. FIG. 2 is a flowchart of an example of a routine performed by the brake ECU 12 so as to determine an establishment of a condition for starting the booster negative pressure control and set the required negative pressure value $P_{req}$. The routine shown in FIG. 2 is repeatedly started every time when one process cycle thereof is finished. When the routine shown in FIG. 2 is started, the process of step 100 is performed first.

In step 100, it is determined whether or not a brake failure has occurred. If a brake operation is performed in a situation where a brake failure has occurred, a braking force corresponding to a pedal effort applied to the brake pedal 48 cannot be generated. Thus, in step 100, the master cylinder pressure $P_{M/C}$ and the vehicle deceleration Gx are used as values representing a pedal effort applied to the brake pedal 48 and a braking force acting on the vehicle, respectively, and if the vehicle deceleration Gx corresponding to the master cylinder pressure $P_{M/C}$ is not generated, it is determined that a brake failure has occurred.

If it is determined that a brake failure has occurred in step 100, it can be judged that a larger assist force should be generated by the brake booster 44 so as to compensate for a decrease in a braking force due to the brake failure. In this case, it is determined that a larger booster negative pressure PB is required as compared to a regular situation, and then the process of step 102 is performed. On the other hand, if no brake failure is detected in step 100, then the process of step 104 is performed.

It should be noted that, when a failure has occurred in one of the brake systems for front wheels and rear wheels, the master cylinder pressure $P_{M/C}$ corresponding to the brake system does not accurately represent the pedal effort applied to the brake pedal 48. As mentioned above, the master pressure sensor 66 for sensing the master cylinder pressure $P_{M/C}$ is provided to the fluid pressure passage 54 corresponding to the brake system for rear wheels. Thus, in step 100, a brake failure in the brake system for the front wheels can be detected.

Generally, a larger braking force is distributed to the front wheels than to the rear wheels. Therefore, when a brake failure has occurred in the brake system for the front wheels, the vehicle deceleration Gx decreases to a greater extent as compared to a case where a brake failure has occurred in the brake system for the rear wheels, when the same pedal effort is applied to the brake pedal 48. Thus, in the above-mentioned step 100, a brake failure can be more positively determined by detecting a brake failure corresponding to the front wheels.

Additionally, when a brake failure has occurred for the front wheels, a larger braking force should be generated as compared to a case where a brake failure has occurred for the rear wheels, because a larger braking force is distributed to the front wheels than to the rear wheels as mentioned above. In this sense, a situation where a larger booster negative pressure PB is required can be more positively detected by determining a brake failure corresponding to the front wheels in the above-mentioned step 100.

It should be noted that, in the above-mentioned step 100, a brake failure may be detected based on the output signal of the pedal effort switch 64 and the vehicle deceleration Gx. The pedal effort switch 64 delivers an ON signal when a predetermined pedal effort is applied to the brake pedal 48, as mentioned above. Accordingly, a value of the vehicle deceleration Gx at a time when the pedal effort switch 64 starts delivering an ON signal represents a value of the vehicle deceleration Gx corresponding to the predetermined pedal effort. Thus, it is possible to detect a brake failure by determining whether a vehicle deceleration GX is generated corresponding to the predetermined pedal effort. In this case, a brake failure is detected for a whole brake system without discrimination between the system for the front wheels and the system for the rear wheels. Additionally, in the above-step 100, the wheel deceleration DVW may be used instead of the vehicle deceleration Gx as a value representing a braking force acting on the vehicle.

In step 104, it is determined whether or not both the brake pedal 48 and the accelerator pedal 70 are depressed. When both the brake pedal 48 and the accelerator pedal 70 are depressed, a braking force and a driving force are simultaneously generated. Thus, when it is determined that both the brake pedal 48 and the accelerator pedal 70 are depressed, it can be judged that the brake booster 44 should generate a larger assist force so as to generate a larger braking force by a value matching the driving force. In this case, it is determined that a larger booster negative pressure PB is required as compared to a regular situation, and then the process of step 102 is performed. On the other hand, if it is determined that at least one of the brake pedal 48 and the accelerator pedal 70 is not depressed in step 104, then the process of step 106 is performed.

In step 106, it is determined whether or not an emergency brake operation is being performed. When an emergency brake operation is being performed, the master cylinder pressure $P_{M/C}$ increases at a greater rate as compared to a case of a regular brake operation. Thus, in step 106, it is determined that an emergency brake operation is being performed when an increasing rate $\Delta P_{M/C}$ (=$dP_{M/C}/dt$) exceeds a predetermined value. It should be noted that the system of the present embodiment can perform the BA control when an emergency brake operation is performed, as mentioned above. Thus, in the above step 106, an emergency brake operation may be detected when the BA control is being performed.

If it is determined that an emergency brake operation is being performed in step 106, it can be judged that a larger braking force is required. In this case, it is determined that a larger booster negative pressure PB is required as compared to a regular situation and then the process of step 102 is performed. On the other hand, if it is determined that an emergency brake operation is not being performed, then the process of step 108 is performed.

In step 108, the reference value P0 is set to be a predetermined value PL. The predetermined value PL is a minimum value of the booster negative pressure PB which should be maintained in a regular situation.

On the other hand, in the above-mentioned step 102, the reference value P0 is set to be a predetermined value PH. The predetermined value PH is a minimum value of the booster negative pressure PB which should be maintained in a situation in which a larger booster negative pressure PB is required as compared to a regular situation. Thus, the predetermined value PH is greater than the predetermined value PL. When the process of step 102 or step 108 is finished, the process of step 110 is performed.

In step 110, the required negative pressure value $P_{req}$ is set. The required negative pressure value $P_{req}$ is set to be a minimum value of the booster negative pressure PB which is sufficient to operate the brake booster 44 until the vehicle stops, in a situation where no negative pressure is supplied to the booster negative pressure chamber 44a from the downstream intake passage 32a.

Figure 3:
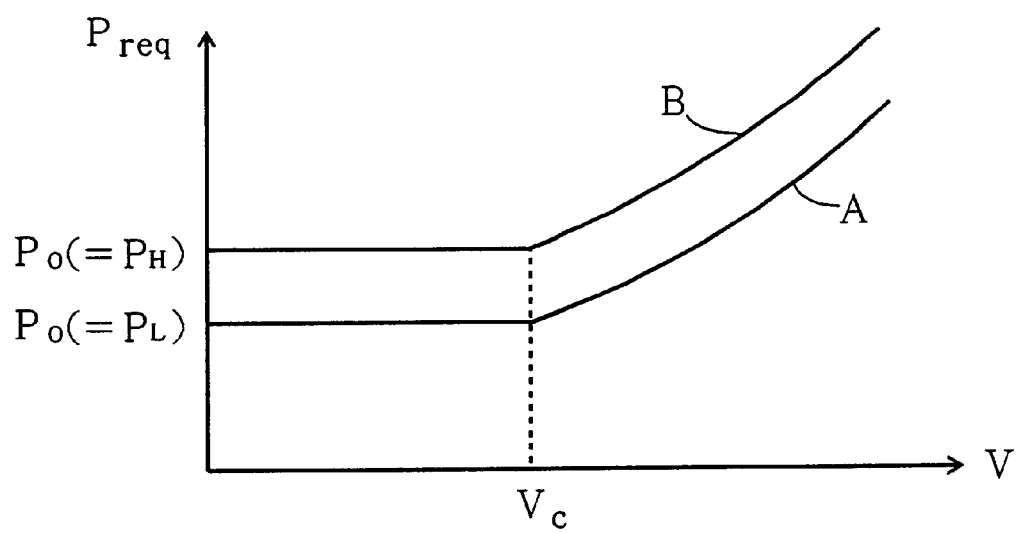
FIG. 3 is an example of a map referred to by the brake ECU so as to determine a required negative pressure value.

FIG. 3 shows an example of a map which is referred to by the brake ECU 60 so as to set the required negative pressure value $P_{req}$ based on the vehicle speed V in step 122. In a regular situation, that is, in a situation where a large booster negative pressure PB is not required (where P0=PL is established), the brake ECU 60 sets the required negative pressure value $P_{req}$ according to a curve A shown in FIG. 3. On the other hand, in a situation where a larger booster negative pressure PB is required (where P0=PH is established), the brake ECU 60 sets the required negative pressure value $P_{req}$ according to a curve B shown in FIG. 3 so that the required negative pressure value $P_{req}$ is set to be greater than a value used in the regular situation.

As mentioned above, the booster negative pressure PB is decreased as a braking force increases. Additionally, a braking force, which is generated at a time when the vehicle stops, is larger for a larger vehicle speed V. Thus, for a larger vehicle speed V, the booster negative pressure PB is decreased to a greater extent until the vehicle stops. In other words, for a larger vehicle speed V becomes larger, a value of the booster negative pressure PB, which should be maintained so as to obtain the assist force generated by the brake booster 44 until the vehicle stops, without supplying any negative pressure to the booster negative pressure chamber 44a, is increased. For this reason, as shown by the curves A and B in FIG. 3, when the vehicle speed V is smaller than or equal to a predetermined value Vc, the required negative pressure value $P_{req}$ is set to be equal to the reference value P0, and when the vehicle speed V exceeds the predetermined value Vc, the required negative pressure value $P_{req}$ is set to be a greater value for a larger vehicle speed V.

In step 112 subsequent to step 110, it is determined whether or not the booster negative pressure PB is larger than the reference value P0. If it is determined that PB is larger than P0, then it is judged that an increase of negative pressure is not required and the present routine is ended. On the other hand, if it is determined that PB is not greater than P0 in step 112, then it is judged that generation of negative pressure is required. In this case, the negative pressure requiring signal including the required negative pressure value $P_{req}$ is transmitted to the engine ECU 12 in step 114 and then the present routine is ended.

Now, a description will be given of a process performed by the engine ECU 12 in the present embodiment. FIG. 4 shows a flowchart of an example of a routine performed by the engine ECU 12 so as to achieve the booster negative pressure control in the present embodiment. The routine shown in FIG. 4 is repeatedly started every time when one cycle process thereof is finished. When the routine shown in FIG. 4 is started, the process of step 150 is performed first.

In step 150, it is determined whether or not the engine 10 is operating in the stratified charge combustion mode. If it is negatively determined, that is, if the engine 10 is operating in the stoichiometric combustion mode, it is judged that the booster negative pressure control cannot be performed without decreasing the power of the engine 10. In this case, no further process is performed thereafter and the present routine is ended. On the other hand, if the engine 10 is operating in the stratified charge combustion mode in step 150, then the process of step 156 is performed.

In step 156, it is determined whether or not the negative pressure requiring signal is being transmitted from the brake ECU 60. If the negative pressure requiring signal is not being transmitted, then the present routine is ended. On the other hand, if the negative pressure requiring signal is being transmitted in step 156, then the process of step 158 is performed.

In step 158, a value of the throttle opening SC for generating an intake manifold negative pressure PM equal to the required negative pressure value $P_{req}$ (hereinafter, this value of the throttle opening SC is referred to as a target throttle opening SCc) is determined. The intake manifold negative pressure PM increases as the specific volume of intake air Q becomes smaller and the rotational speed Ne becomes greater. Additionally, the specific volume of intake air Q is substantially proportional to the throttle opening SC. Thus, in step 158, the target throttle opening SCc is determined based on the rotational speed Ne and the required negative pressure value $P_{req}$. When the process of step 158 is finished, then the process of step 160 is performed.

In step 160, a value Q0 of the specific volume of intake air Q corresponding to the target throttle opening SCc is calculated. In the subsequent step 162, a value F of the injection quantity corresponding to the accelerator opening AC in the stratified charge combustion mode (that is, a value of the injection quantity which is necessary to achieve the engine power required by a driver) is calculated. It should be noted that an injection quantity necessary to achieve a constant engine power increases when the throttle opening SC is decreased to the target throttle opening SCc due to an increase in the pumping loss. In step 162, such an influence due to the increase in the pumping loss is taken into consideration in calculating the injection quantity F. When the process of step 162 is finished, then the process of step 164 is performed.

In step 164, it is determined whether or not the stratified charge combustion mode can be maintained with the specific volume of intake air Q0 and the injection quantity F while maintaining the current rotational speed Ne. If it is determined that the stratified charge combustion can be maintained, then in step 166, the throttle opening SC is decreased to the target throttle opening SCc. After the process of step 166 is performed, the intake manifold negative pressure PM starts being increased toward the required negative pressure $P_{req}$. In the subsequent step 168, it is determined whether or not the intake manifold negative pressure PM has reached the required negative pressure value $P_{req}$. If it is negatively determined in step 168, then the process of step 168 is performed again. On the other hand, if it is affirmatively determined in step 168, then the process of step 170 is performed.

In step 170, the throttle valve 34 is fully opened again and the injection quantity is decreased by a value corresponding to a decrease in the pumping loss due to the increase in the throttle opening SC. When the process of step 170 is finished, then the present routine is ended.

On the other hand, if, in step 164, it is determined that the stratified charge combustion mode cannot be maintained, then the operation mode of the engine 10 is switched to the stoichiometric combustion mode in step 172. In the stoichiometric combustion mode, a larger intake manifold negative pressure PM is generated as compared to a case of the stratified charge combustion mode because the throttle opening SC is decreased to a value corresponding to the accelerator opening AC. Therefore, after the process of step 172 is performed, the intake manifold negative pressure PM starts being increased.

In the subsequent step 174, it is determined whether or not the intake manifold negative pressure PM has reached the required negative pressure value $P_{req}$. If it is negatively determined in step 174, then the process of step 174 is performed again. On the other hand, if it is affirmatively determined in step 174, then the process of step 176 is performed.

In step 176, the operation mode of the engine 10 is returned to the stratified charge combustion mode. When the process of step 176 is finished, the present routine is ended.

As mentioned above, in a situation where a larger booster negative pressure PB is required as compared to a regular situation, the reference value P0 which defines the condition for starting the booster negative pressure control and the required negative pressure value $P_{req}$ which is used as a target value of the booster negative control are set to be larger than their values used in the regular situation by the brake ECU 60 performing the routine shown in FIG. 2. Additionally, the intake manifold negative pressure PM increases toward the required negative pressure $P_{req}$ by the engine ECU 12 performing the routine shown in FIG. 4. Consequently, according to the present embodiment, in a situation where a larger booster negative pressure PB is required as compared to a regular situation, a larger negative pressure can be supplied to the booster negative pressure chamber 44a. Thus, according to the system of the present embodiment, since the booster negative pressure control is performed in accordance with the situation, the required booster negative pressure PB can be positively achieved without unnecessarily generating negative pressure, that is, without unnecessarily reducing the throttle opening SC.

In the above-mentioned embodiment, each of the reference value P0 and the required negative pressure value $P_{req}$ is switched between two levels, namely, a level for a regular situation and a level for a situation in which a larger booster negative pressure PB is required. However, each of the reference value P0 and the required negative pressure value $P_{req}$ may be switched among three or more levels or may be linearly changed in accordance a value of the booster negative pressure PB which is required.

Additionally, in the above-mentioned embodiment, execution of the booster negative pressure control is permitted only when the engine 10 is operating in the stratified charge combustion mode, in view of giving priority to maintaining the engine power rather than maintaining the booster negative pressure PB. However, it is also possible to give priority to maintaining the booster negative pressure PB. That is, it is possible to forcibly decrease the throttle opening SC in the stoichiometric combustion mode when a larger booster negative pressure PB is required. In this sense, the present invention can be applied to a normal engine whose power is controlled based on the throttle opening SC (that is, an engine which always operates in the stoichiometric combustion mode).

Further, the present invention is not limited to the embodiment, but variations and modifications may be made without departing from the scope of the present invention.

The present application is based on Japanese priority application No. 10-151584 filed on Jun. 1, 1998, the entire contents of which are hereby incorporated by reference.

What is claimed is:

1. A negative pressure control apparatus for a brake booster for controlling negative pressure in a negative pressure chamber of the brake booster, which brake booster assisting a brake operation using the negative pressure, said apparatus comprising:

a negative pressure controller for controlling the negative pressure in said negative pressure chamber toward a predetermined target value;

a pedal operation determining part for determining whether or not both an accelerator pedal and a brake pedal are depressed; and a target negative pressure setting part for setting said predetermined target value to be larger than a value used in a regular situation when said pedal operation determining part determines that both the accelerator pedal and the brake pedal are depressed.

2. The negative pressure control apparatus for a brake booster as claimed in claim 1, wherein said negative pressure chamber can be connected to an intake pipe of an engine at a position downstream of a throttle valve, and said negative pressure controller controls the negative pressure in said negative pressure chamber by changing an opening of said throttle valve.

3. The negative pressure control apparatus for a brake booster as claimed in claim 2, wherein said engine can operate in one of a stoichiometric combustion mode and a stratified charge combustion mode, and said negative pressure control apparatus further comprises:

a mode determining part for, when said negative pressure controller changes the opening of the throttle valve while the engine is operating in the stratified charge combustion mode, determining whether or not the stratified charge combustion mode can be maintained; and a mode switching part for switching the operation mode of the engine to said stoichiometric combustion mode when said mode determining part determines that the stratified charge combustion mode cannot be maintained.

4. The negative pressure control apparatus for a brake booster as claimed in claim 3, wherein said mode determining part determines whether or not the stratified charge combustion mode can be maintained based on said predetermined target value and the operating state of the accelerator pedal.

5. The negative pressure control apparatus for a brake booster as claimed in claim 1, wherein said negative pressure controller controls the negative pressure in the negative pressure chamber toward the predetermined target value when said negative pressure becomes smaller than a predetermined reference value.

6. The negative pressure control apparatus for a brake booster as claimed in claim 5, further comprising:

a reference value setting part for setting said predetermined reference value to be larger than a value used in the regular situation when said pedal operation determining part determines that both the accelerator pedal and the brake pedal are depressed.

7. The negative pressure control apparatus for a brake booster as claimed in claim 1, wherein said target negative pressure setting part sets said predetermined target value in accordance with a vehicle speed.

* * * * *